(12) United States Patent
Zhou et al.

(10) Patent No.: US 7,082,307 B2
(45) Date of Patent: Jul. 25, 2006

(54) METHOD FOR IMPLEMENTING MOBILE NUMBER PORTABILITY

(75) Inventors: Yabin Zhou, Shen-Zhen (CN); Jian Luo, Shen-Zhen (CN); Zhijun Zhang, Shen-Zhen (CN)

(73) Assignee: Huawei Technologies,Co., Ltd., Shen-Zhen (CN)

( * ) Notice: Subject to any disclaimer, the term of this patent is extended or adjusted under 35 U.S.C. 154(b) by 405 days.

(21) Appl. No.: 10/321,256

(22) Filed: Dec. 17, 2002

(65) Prior Publication Data

US 2003/0181206 A1    Sep. 25, 2003

(30) Foreign Application Priority Data

Jan. 6, 2002    (CN) ............................... 02 1 02173

(51) Int. Cl.
*H04Q 7/22* (2006.01)
(52) U.S. Cl. .................. 455/445; 455/432.1; 455/445; 455/433; 455/434; 455/560
(58) Field of Classification Search ................ 455/445, 455/433, 434, 561, 552, 426, 410; 370/335, 370/342, 441
See application file for complete search history.

(56) References Cited

U.S. PATENT DOCUMENTS 5,577,103 A * 11/1996 Foti ......................... 455/412.1

(Continued)

FOREIGN PATENT DOCUMENTS

WO    WO 9811754 A1 *  3/1998
WO    WO 9911087 A2 *  3/1999

OTHER PUBLICATIONS

Jatuporn Pliancharoen, Optimum Traffic Channel in GSM Network, 2001.*

*Primary Examiner*—Temica Beamer
*Assistant Examiner*—Julio Perez
(74) *Attorney, Agent, or Firm*—Dorsey & Whitney LLP

(57) ABSTRACT

A scheme is provided for realizing Mobile Number Portability (MNP) by utilizing a signaling flow of prior mobile network standards such that no modification to the main apparatuses, such as VMSC, GMSC, and HLR, and the like, of the prior networks is required; only a NPDB+ apparatus is required and added, that is, a combination of NPDB and NPHLR. A user of Number portability from an original or home network to a second or other network will be a user of Number Portability out (NP out) among the users of the second network. The number section of the user belongs in the network, and it is able to assign a virtual roaming number to identify the situation of Number Portability (NP) of the user. A user of Number Portability from the second network to the home network is a user of Number Portability in (NP in) among the users of the home network. The NPDB+ apparatus is newly built to store the data of MNP mobile users who enter the home network and to accomplish the associated functions without any modification to the structure of the network. The distribution technology is used for storing the data of the NPDB+. The database is of high reliability such that the circuitous voice circuits do not existed, and the metering between the networks is easy. The newly added apparatus NPDB+ is superimposed on the prior networks, when there are less users during an early period, and only small amount of construction is required. The expansion of the capacity of the networks can be completed by adding portions of an apparatus based on the development condition of MNP services. The expansiveness of the networks is excellent, particularly, it is suitable for the mobile operating agents who have very large scale prior networks.

4 Claims, 2 Drawing Sheets

U.S. PATENT DOCUMENTS

| | | | |
|---|---|---|---|
| 6,073,015 A | * | 6/2000 | Berggren et al. ......... 455/432.2 |
| 6,161,017 A | * | 12/2000 | Britt et al. .................. 455/445 |
| 6,178,337 B1 | * | 1/2001 | Spartz et al. ............... 455/561 |
| 6,353,621 B1 | * | 3/2002 | Boland et al. .............. 370/467 |
| 6,408,181 B1 | * | 6/2002 | Ho et al. ................. 455/432.1 |
| 6,424,638 B1 | * | 7/2002 | Ray et al. ................... 370/331 |
| 2002/0168960 A1 | * | 11/2002 | Jacobson et al. ........... 455/410 |
| 2004/0214586 A1 | * | 10/2004 | Loganathan et al. ..... 455/456.2 |

* cited by examiner

METHOD FOR IMPLEMENTING MOBILE NUMBER PORTABILITY

FIELD OF THE INVENTION

The present invention relates to a method of mobile communication. In particularly, the present invention relates to a method for implementing number portability (NP) in mobile communication.

BACKGROUND OF THE INVENTION

Mobile Number Portability (MNP) is a capability that a network provides to users, which allows a mobile user to change subscribed networks in the same country rather than change the original MSISDN number. The realization of the Mobile Number Portability (MNP) will protect the benefits of the users, facilitate equal competition, improve network efficiency and decrease the related cost.

In general, there are three existing schemes for realizing the Mobile Number Portability (MNP): an intelligent network scheme, a signaling relay scheme using STP (Signal Transfer Point) mode to realize MNP_STP (Mobile Number Portability Signaling Transfer Point), and a forward transfer scheme. An intelligent network scheme and a forward transfer scheme are used for solving the Mobile Number Portability (MNP) of voice services, and MNP_STP signaling relay scheme is used for solving the Mobile Number Portability (MNP) of the voice services and non-voice services. According to physical requirements and conditions of a network used by operating agents, the implementation details of these schemes are different. The principle for realizing the Mobile Number Portability (MNP) by the intelligent network and the MNP_STP signaling relay have been introduced in <<ESTI GSM 03.66>>. However, schemes for realizing Mobile Number Portability (MNP) are not explicit specifically. Thus, there is a need for a method that is based on intelligent network technology and is implemented in the intelligent networks to realize Mobile Number Portability (MNP). Such method has not been mentioned in any associated known protocols or employed by any operating agent who has developed MNP.

For realizing the services of the Mobile Number Portability (MNP), by aiming at mobile networks which already have large scale networks and a plurality of users, the disadvantages that are present in the above three kinds of schemes are more or less as follows:

(1) The disadvantages of employing the MNP_STP signaling relay scheme include that:

1. The signaling networks need to be rebuilt, the direct links need to be modified to a mode that they are not connected directly, thereby significantly affecting the prior networks;

2. Each time when a mobile service is being called, it may go through the MNP_STP, even though there are only a few users during an early period;

3. If it is based on a scheme introduced by <<ESTI GSM 03.66>>, realizing the interworking between operating agents is required.

(2) The disadvantages of employing the intelligent network scheme introduced in <<ESTI GSM 03.66>> specification include that:

1. For an apparatus of a Visited Mobile Switch Center (VMSC) and a Gateway Mobile Switch Center (GMSC) of the entire network, software often needs to be upgraded;

2. Only Mobile Number Portability (MNP) of the voice Switch s can be solved. The Mobile Number Portability (MNP) services of the non-voice services cannot be solved.

(3) The disadvantages of the forward transfer scheme include that:

1. A call list introduced by the forward transfer scheme may be produced in the Visited Mobile Switch Center (VMSC) and the Gateway Mobile Switch Center (GMSC). However, a call list cannot be used for metering or calculating fees. Also, it may be necessary to identify a call list and/or delete the call list by a metering center. Thus, an operating system is required to manage these types of operations.

2. The effects of the failures will damage services of a caller and damage forward transfer services of a user being called.

In addition, U.S. Pat. No. 6,161,017 disclosed a method of routing calls to portable numbers in a radio telecommunications network.

SUMMARY OF THE INVENTION

Aiming at the disadvantages of the above schemes, the technical scheme of the present invention provides a method of realizing Mobile Number Portability (MNP) by utilizing the signaling flow of the prior mobile network standards. By utilizing these technology, no modification to the main apparatuses, such as the visited MSC (VMSC), the Gateway MSC (GMSC), and the Home Location Register (HLR), and the like, of the prior networks is required, only a NPDB+ (Number Portability DataBase+) apparatus serving as a combination of NPDB and NPHLR is required and added. While MNP of the voice services can be solved by the scheme, if the function of NPDB+ is expanded to non-voice services, MNP of non-voice services can also be solved. In this method, it is possible for Number Portability of a user from an original network to the other network to be a user of Number Portability out (NP out) among the users of the other network, the number section of which belongs in the network. Also, the method assigns a virtual roaming number to identify the situation of Number Portability (NP) of a user, and at the meantime, it is possible for Number Portability of the user from the other network to the home network to be a user of Number Portability in (NP in) among the users of the home network. The NPDB+ apparatus is newly built to store the data of MNP mobile users who enter the home network and to accomplish the associated functions.

A method of implementing Number Portability of a user from a home mobile network to a second mobile network, comprises the steps of:

calling the user by a caller of the home mobile network, a Directory Number of the home mobile network of the user being carried to the second mobile network;

routing the call to VMSCA;

transmitting a SRI REQ message for retrieving a roaming number by the VMSCA to HLR of the user, the Directory Number of the home mobile network of the user being carried to the second mobile network;

transmitting a PRN REQ message to GMSCA by the HLR of the user, the Directory Number of the home mobile network of the user being carried to the second mobile network;

determining the received PRN RFQ message by the GMSCA to trigger an intelligent service to NPDB+;

deciding the user, of whom the Directory Number of the home mobile network is carried to the second mobile network, by the NPDB+, to determine whether the user is really a user, of whom the home mobile network Directory Number being carried to the second mobile network, or not, if the decision is Yes, then a virtual roaming number is assigned, and returned back to the GMSCA in a CONNECT message; if the decision is No, then an error code is returned back to the GMSCA;

returning the virtual roaming number to the HLR by the GMSCA in a PRN RSP message;

returning the virtual roaming number to the GMSCA by the HLR in a SRI ACK message;

analyzing the virtual roaming number by the VMSCA, and routing the call to a prior gateway MSCB of the home mobile network;

routing the call to a gateway MSCC by the gateway MSCB based on a routed number; and determining a current subscribed network by the home mobile network for the user, of whom the home mobile networks Directory Number is carried to the second mobile network.

In the method of carrying the Directory Number of the home mobile network to the second mobile network, the caller of the home mobile network is a mobile user of the home mobile network, and the caller performs an operation of retrieving a roaming number for a NP out user at a caller terminal center.

In the method of carrying the Directory Number of the home mobile network to the second mobile network, the caller is a fixed user, and the caller performs an operation of retrieving a roaming number of a NP out user at the gateway of the home mobile network.

In the method of carrying the Directory Number of the home mobile network to the second mobile network, the virtual roaming number is in a form of RN+MSISDN.

A method of carrying a Directory Number of a second mobile network to a home mobile network, comprises the steps of:

calling a user by a caller of the home mobile network, a Directory Number of the second mobile network being carried to the home mobile network;

routing the call to the Gateway Mobile Switch Center (GMSCA) by the Visited Mobile Switch Center (VMSCA);

transmitting a SRI REQ message of retrieving a roaming number by the Gateway Mobile Switch Center (GMSCA) to the Number Portability DataBase+(NPDB+) for the user of the second mobile network;

relaying the message to an internal Number Portability Home Location Regisiter(NPHLR) function module via an internal interface, after the Number Portability DataBase+ (NPDB+) receiving the SRI REQ message;

transmitting the operation of retrieving the roaming number by the internal Number Portability Home Location Regisiter (NPHLR) function module to the Visited Mobile Switch Center (VMSC) of the home mobile network, and returning a result of the operation back to the Gateway Mobile Switch Center (GMSCA) by a normal SRI ACK message; and routing the call to the Visited Mobile Switch Center/the Gateway Mobile Switch Center (VMSCB/GMSCB) by the Gateway Mobile Switch Center(GMSCA) based on the returned roaming number/routing number. The method of carrying the Directory Number of the second mobile network to the home mobile network, after the NPHLR function module transmits the PRN REQ operation for retrieving a roaming number to BMSC of the home mobile network, further comprises the steps of:

indicating that the user is a user of whom the Directory Number of the home mobile network is carried to the second mobile network, if the operation is assertive; and indicating that the user is a user of the second mobile network if the operation is unassertive, and transmitting a query by the NPHLR to the NPDB via an internal interface; deciding a current subscribed network of the user by the NPDB, and returning the routing number to the NPHLR, thereby obtaining the roaming number of the assertive operation or the routing number of the unassertive operation.

In the method of carrying the Directory Number of the second mobile network to the home mobile network, the query transmitted by the NPHLR to the NPDB may be performed via the internal interface of the NPDB and the NPHLR.

The advantages of the present invention include: with less affection to the prior networks, concentrating the modification on GMSC or NPDB+ which does not require modification of the structures of the networks; using distribution technology for storing the data of the NPDB+, the database being high reliability such that circuitous voice circuits do not exist in the scheme, and it is easy to meter between the networks; a new added apparatus NPDB+ is superimposed on the prior networks, such that when there are less users during an early period, only small amount of construction is required, and the expansion of the capacity of the networks can be completed by adding portions of the apparatus based on the development condition of MNP services; the expansibility of the networks is excellent, particularly, it is suitable for the mobile operating agents who have very large scale prior networks.

Comparing with an relay mode of a MNP_STP signaling, MNP user numbers are subject to a location register that is belonged to the operating agents, but the user data are still stored in the HLR.

The services of Number Portability are realized by employing the present method. For a NP out user of the home network, when a caller of the home network calls the NP out user, the current subscribed network of the NP out user of the home network should be determined then in the home network, and the call can be routed correctly to the network. For a NP in user of the home network, when a caller of the home network calls the NP in user, the call should not take a circuitous route to the user's number section belonged to the network, and the connection of a voice circuit should be accomplished in the home network. When the NP in user of the home network is called, there are two organization modes of a call route by employing the present method. In the first mode, in order to avoid a mobile terminal center from making SCCP routing data of its network number code section, it is not necessary for the mobile terminal center of the home network to determine whether the user has already been NP in or not, and the only need is to route the call to the newly built GMSC (NP_GMSC) for processing. In the second mode, the mobile terminal center makes the SCCP routing data of its network number code section directly, the called message for retrieving routing information is sent directly to NPDB+, and the correct routing information of the user is sent back in a responding message by the NPDB+. If the user is a NP in user, then a roaming number of the home network is sent back. If the user is not a NP in user, then a number of the called mobile user, of whom a pass through network number is carried, is sent back. The NPDB+ is built on the base of a mobile intelligent network with standard specification, for masking the affection to the GMSC of the home network by the NP in user from the second network to the home network.

For realizing Mobile Number Portability, besides the virtual roaming number and NPDB+ scheme as mentioned-above in the present invention, there are the forward transfer scheme, the intelligent scheme, and the MNP_STP signaling relay scheme. However, the latter three schemes involve the disadvantages as described above. It will be appreciated that a part of the contents of the above three schemes may be used to solve the conditions of the NP out user of the home network or the NP in user of the second network.

The scheme that the present invention relates to is to realize the services of Mobile Number Portability with a new method that has not been proposed at a current stage. The main features of which are:

1. MNP service information is transferred by utilizing word fields of MSRN (G network) or TLDN (C network) in a signaling flow process for retrieving a roaming number;

2. The signaling flow process for implementing MNP services as mentioned in the above schemes;

3. NPDB and NPHLR are incorporated;

4. NPDB and NPHLR communicate via interface information;

5. The errors are not sent back after failing to retrieve the roaming number.

DETAILED DESCRIPTION OF THE PREFERRED EMBODIMENTS

Figure 1:
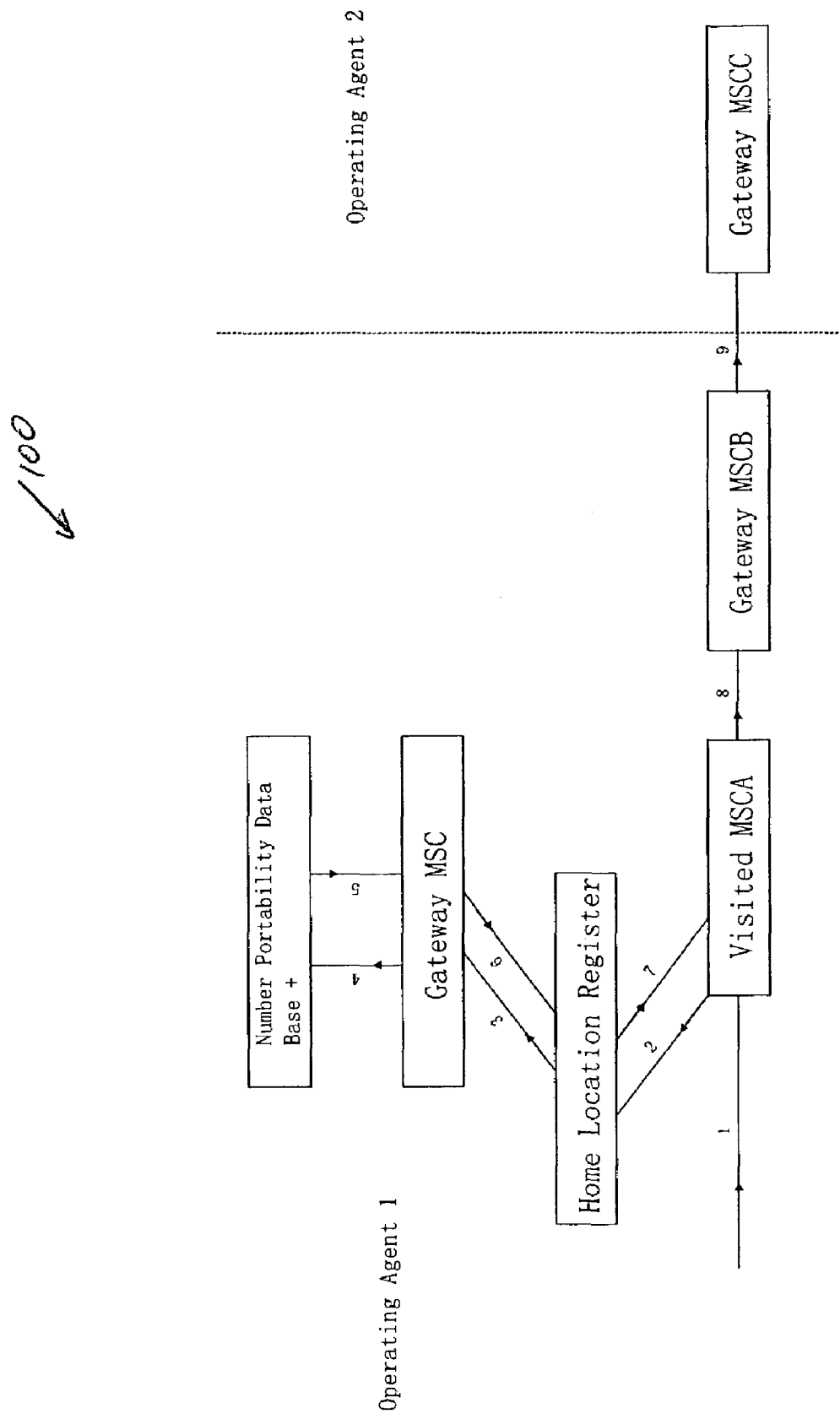
FIG. 1 is a flowchart of operations of one method of calling by a user of a home network a NP out user who carries a Directory Number of the home network to a second network, in accordance with the principles of the present invention.

The first embodiment of the present invention is illustrated in FIG. 1 which provides a flow process 100 for a home network user calling a NP out user, of whom a Directory Number of the home network is carried to a second network or other network; that is, voice services of the NP out users of the home network are implemented by a virtual roaming number scheme:

(A) In a flow process where a mobile user of the home network calls a NP out user, of whom a Directory Number of the home network is carried to the second network, the process includes the following operations:

1. The mobile user A of the home network originates a call for calling an original mobile user B of the home network (NP out), and the call is routed to VMSCA;

2. A SRI REQ message for retrieving a roaming number is transmitted by the VMSCA to HLR belonged to the user B;

3. A PRN REQ message (IMSI number of the user) is transmitted to GMSCA by the HLR belonged to the user B (when NP services are handled by a user, the user data are stored in the GMSCA, and a location update is transmitted by the GMSCA (which simulates VLR) to the HLR belonged to the user B, the numbers of the GMSCA are stored in the HLR);

4. The received PRN REQ message is decided by the GMSCA, and the intelligent services will be triggered to NPDB+ (an IDP message);

5. Whether the user B is a NP out user or not is decided by the NPDB+; if it is, then a virtual roaming number (in the form of RN+MSISDN) will be assigned, and it will be sent back to the GMSCA in a CONNECT message; if the user B is not a NP out user, then an error code will be sent back to the GMSCA.

6. The virtual roaming number will be sent back by the GMSCA to the HLR in a PRN RSP message;

7. The virtual roaming number will be sent back by the HLR to the GMSCA in a SRI ACK message;

8. The Virtual roaming number is analyzed by the VMSCA (based on the results of the analysis), and the call is routed to the current gateway GMSCB of the home network. The format of the number is RN+MSISDN, and the type of the number is MSRN;

9. The call may be routed by the GMSCB to gateway GMSCC of an operating agent 2 based on RN. The format of the number is RN+MSISDNB, the type of the number is MSISDNB.

(B) A fixed user of the home network calls a NP out user, of whom a Directory Number of the home network is carried to a second network or the other network (the condition is the same as a fixed user calls a NP in user of the second or other network).

Under the condition that a caller is a mobile user of the home network, the only difference between the flow processes of a fixed user calling a NP out user of the home network and a mobile user of the home network calling a NP out user of the home network is that the operation of retrieving the roaming number may be originated at a caller terminal; under the condition that the caller is PSTN, the operation of retrieving the roaming number may be originated at the gateway of the home network.

Figure 2:
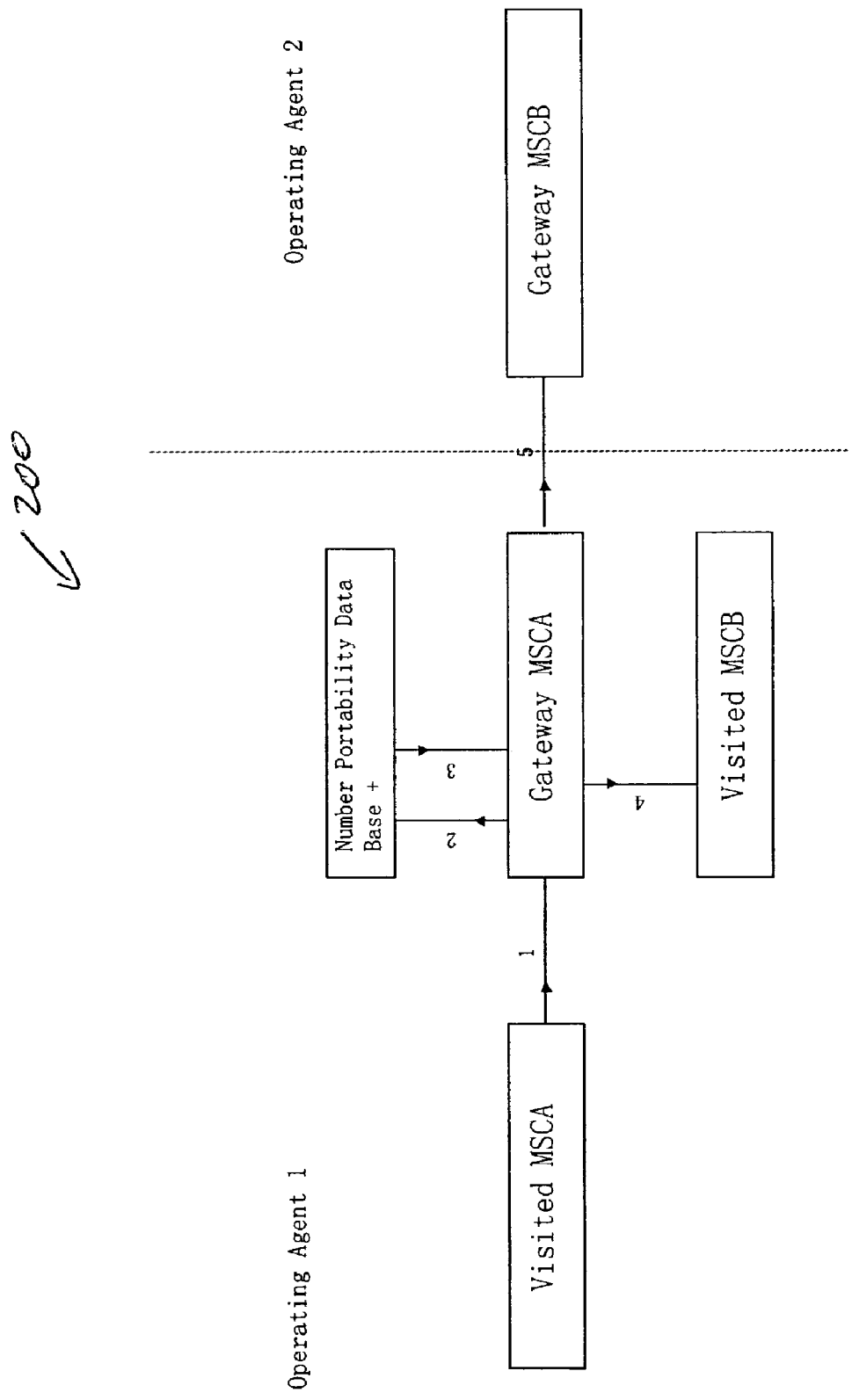
FIG. 2 is a flowchart of operations of one method of calling by a user of a home network a NP in user who carries a Directory Number of a second network to the home network, in accordance with the principles of the present invention.

The second embodiment of the present invention is illustrated in FIG. 2 which provides a flow process 200 of a mobile user of the home network calling a NP in user, of whom a Directory Number of the second or other mobile network is carried to the home mobile network, and a flow process of a mobile user of the home mobile network calling a NP in user, of whom a Directory Number of the second or other mobile network is not carried to the home mobile network:

1. A call originated by a mobile user A of the home mobile network to a user B of the second or other mobile network may be routed to GMSCA from VMSCA;

2. A SRI REQ message of retrieving a roaming number is transmitted by the GMSCA to NPDB+ for a user of the second or other mobile network;

3/4/5. The SRI REQ message is received by the NPDB+, the message is relayed by the NPDB+ firstly to an internal NPHLR function module via an internal interface, then, whether the user is present in the home mobile network or not is decided by NPHLR; if the user is present, then an operation of retrieving the roaming number from the VMSCB of the home mobile network is originated by the NPHLR to obtain an actual roaming number of the user, and it will be sent back to the GMSCA in a SRI ACK message; if the user is not present, then the current subscribed network of the user will be decided by the NPHLR via the internal interface of the NPDB, and a routing number (RN+MSISDN) will be sent back to the GMSCA in the SRI ACK message as the roaming number. A query originated from the NPHLR to NPDB is performed via the NPDB and the internal interface of the NPHLR and is transparent to GMSC. The interface between the NPDB module and the NPHLR module in the NPDB+ is that the NPHLR requires a function for originating the query of the NPDB after retrieving the roaming number, and the NPDB module requires a function for responding to the query. Another function of the NPHLR module or NPDB module is the same as the function of one single HLR or single NPDB);

6/7. The call may be routed to the VMSCB/GMSCB by the GMSCA based on the roaming number/routing number returned by the NPDB+.

The abbreviations used in the present invention are defined as follows:
MNP: Mobile Number Portability
MNP_STP: MNP Signaling Transfer Point
DN: Directory Number
RN: Routing Number
MSISDN: Mobile Station ISDN Number
MSC: Mobile Switch Center
VMSC: The Visited MSC
GMSC: Gateway MSC
HLR: Home Location Register
IDP: Initial Detection Point
NPDB: Number Portability Data Base
NPHLR: Number Portability HLR
SRI: Send Routing Information
PRN: Provide Roaming Number
NP in: Number Portability in
NP out: Number Portability out

What is claimed is:

1. A method of implementing number portability of a user from a home mobile network to a second mobile network, comprising the steps of:
calling the user by a caller of the home mobile network, a Directory Number of the home mobile network of the user being carried to the second mobile network;
routing the call to Visited Mobile Switch Center (VMSCA);
transmitting a SRI REQ message for retrieving a roaming number by the Visited Mobile Switch Center (VMSCA) to Home Location Register (HLR) of the user, the Directory Number of the home mobile network of the user being carried to the second mobile network;
transmitting a PRN REQ message to Gateway Mobile Switch Center (GMSCA) by the Home Location Register (HLR) of the user, the Directory Number of the home mobile network of the user being carried to the second mobile network;
determining the received PRN RFQ message by the Gateway Mobile Switch Center (GMSCA) to trigger an intelligent service to Number Portability DataBase+ (NPDB+);
deciding the user, of whom the Directory Number of the home mobile network is carried to the second mobile network, by the Number Portability DataBase+ (NPDB+), to determine whether the user is really a user, of whom the home mobile network Directory Number being carried to the second mobile network, or not, if the decision is Yes, then a virtual roaming number is assigned, and returned back to the Gateway Mobile Switch Center (GMSCA) in a CONNECT message; if the decision is No, then an error code is returned back to the Gateway Mobile Switch Center (GMSCA);
returning the virtual roaming number to the Home Location Register (HLR) by the Gateway Mobile Switch Center (GMSCA) in a PRN RSP message;
returning the virtual roaming number to the Gateway Mobile Switch Center (GMSCA) by the Home Location Register (HLR) in a SRI ACK message;
analyzing the virtual roaming number by the Visited Mobile Switch Center (VMSCA), and routing the call to a prior Gateway Mobile Switch Center (GMSCB) of the home mobile network;
routing the call to a Gateway Mobile Switch Center (GMSCC) by the Gateway Mobile Switch Center (GMSCB) based on a routed number; and
determining a current subscribed network by the home mobile network for the user, of whom the home mobile networks Directory Number is carried to the second mobile network.

2. The method according to claim 1, wherein the virtual roaming number is a combination of the Routing Number (RN) plus Mobile Station Integrated Digital Network Number (MSISDN).

3. A method of implementing number portability of user from a second mobile network to a home mobile network, comprises the steps of:
calling a user by a caller of the home mobile network, a Directory Number of the second mobile network being carried to the home mobile network;
routing the call to the Gateway Mobile Switch Center (GMSCA) by the Visited Mobile Switch Center (VMSCA);
transmitting a SRI REQ message of retrieving a roaming number by the Gateway Mobile Switch Center (GMSCA) to the Number Portability DataBase+ (NPDB+) for the user of the second mobile network;
relaying the message to an internal Number Portability Home Location Register (NPHLR) function module via an internal interface, after the Number Portability DataBase+(NPDB+) receiving the SRI REQ message;
transmitting the operation of retrieving the roaming number by the internal Number Portability Home Location Register (NPHLR) function module to the Visited Mobile Switch Center (VMSC) of the home mobile network, and returning a result of the operation back to the Gateway Mobile Switch Center (GMSCA) by a normal SRI ACK message; and
routing the call to the Visited Mobile Switch Center/the Gateway Mobile Switch Center (VMSCB/GMSCB) by the Gateway Mobile Switch Center (GMSCA) based on the returned roaming number/routing number.

4. The method according to claim 3, wherein after the Number Portability Home Location Register (NPHLR) function module transmits the PRN REQ operation for retrieving a roaming number to the Visited Mobile Switch Center (VMSC) of the home mobile network, the method further comprises the steps of:
indicating that the user is a user of whom the Directory Number of the home mobile network is carried to the second mobile network, if the operation is assertive; and indicating that the user is a user of the second mobile network if the operation is unassertive, and transmitting a query by the Number Portability Home Location Register (NPHLR) to the Number Portability DataBase (NPDB) via an internal interface; deciding a current subscribed network of the user by the Number Portability DataBase (NPDB), and returning the routing number to the Number Portability Home Location Register (NPHLR), thereby obtaining the roaming number of the assertive operation or the routing number of the unassertive operation.

* * * * *